United States Patent
Xie

(10) Patent No.: US 11,320,991 B2
(45) Date of Patent: May 3, 2022

(54) IDENTIFYING SUB-HEALTH OBJECT STORAGE DEVICES IN A DATA STORAGE SYSTEM

(71) Applicant: HUAWEI TECHNOLOGIES CO., LTD., Guangdong (CN)

(72) Inventor: Huiyun Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 16/903,762

(22) Filed: Jun. 17, 2020

(65) Prior Publication Data
US 2020/0310660 A1 Oct. 1, 2020

Related U.S. Application Data

(63) Continuation of application No. PCT/CN2017/116951, filed on Dec. 18, 2017.

(51) Int. Cl.
*G06F 3/06* (2006.01)

(52) U.S. Cl.
CPC .......... *G06F 3/0619* (2013.01); *G06F 3/065* (2013.01); *G06F 3/067* (2013.01); *G06F 3/0644* (2013.01); *G06F 3/0659* (2013.01)

(58) Field of Classification Search
CPC ...... G06F 3/0619; G06F 3/0644; G06F 3/065; G06F 3/0659; G06F 3/067
See application file for complete search history.

(56) References Cited

U.S. PATENT DOCUMENTS

| | | | |
|---|---|---|---|
| 7,461,302 B2 | 12/2008 | Halevy | |
| 9,304,815 B1* | 4/2016 | Vasanth | .................. G06F 3/067 |
| 11,232,000 B1* | 1/2022 | Bhatia | ................. G06F 11/1451 |
| 2012/0023179 A1* | 1/2012 | Bernbo | ............... H04L 67/1097 |
| | | | 709/206 |
| 2017/0010931 A1 | 1/2017 | Agarwal et al. | |
| 2017/0242767 A1 | 8/2017 | Wang et al. | |
| 2019/0196728 A1 | 6/2019 | Feng | |

FOREIGN PATENT DOCUMENTS

| | | |
|---|---|---|
| CN | 101706805 A | 5/2010 |
| CN | 102023816 A | 4/2011 |
| CN | 102368222 A | 3/2012 |
| CN | 102385537 A | 3/2012 |
| CN | 103797770 A | 5/2014 |
| CN | 106406758 A | 2/2017 |
| CN | 106980468 A | 7/2017 |
| EP | 3188449 A1 | 7/2017 |

* cited by examiner

*Primary Examiner* — Eric Cardwell

(57) ABSTRACT

In a method for identifying a sub-health OSD in a data storage system, a first OSD receives a write request and replicates that write request to a second OSD. Subsequently, the first OSD sends a report regarding the write request to a management node in the system. The report includes an identifier of the first OSD, an identifier of the second OSD, and health status information of the second OSD. The management node determines, based on the received report, whether the second OSD is in a sub-health state.

23 Claims, 4 Drawing Sheets

IDENTIFYING SUB-HEALTH OBJECT STORAGE DEVICES IN A DATA STORAGE SYSTEM

CROSS-REFERENCE TO RELATED APPLICATIONS

This application is a continuation of International Application No. PCT/CN2017/116951, filed on Dec. 18, 2017, the disclosure of which is hereby incorporated by reference in its entirety.

TECHNICAL FIELD

Embodiments of the present invention relate to storage technologies, and in particular, to a method for identifying a sub-health object storage device (OSD), an apparatus and a data storage system.

BACKGROUND

A sub-health problem in a storage node in a distributed storage system may severely affect availability of an entire distributed storage system. A conventional solution may be as follows: A storage node periodically reports a heartbeat to a management device. If the storage node has a sub-health fault, which results in a heartbeat loss, offline isolation processing is performed on the node. Alternatively, a conventional solution may be as follows: A fault detection module built in a storage node detects that an input/output (I/O for short) delay is greater than a predetermined threshold, and reports a fault to a management node. The management node performs offline isolation on the storage node. The conventional distributed storage system has a large delay in sub-health monitoring and processing on the storage node, the sub-health fault affects the distributed storage system for a long time, and availability of the distributed storage system is greatly compromised.

SUMMARY

In view of this, this application provides a method for identifying a sub-health object storage device (OSD), an apparatus, and a system.

According to a first aspect of this application, a data storage system is provided, where the system includes a management node and a plurality of storage nodes, a plurality of OSDs are deployed in the system, the plurality of OSDs are located on the plurality of storage nodes, and the plurality of OSDs include a first OSD and a second OSD. The first OSD is configured to: receive a first write data request, where the first write data request includes a to-be-written data block and a corresponding partition to be written with data; determine, based on a partition allocation view, that a secondary OSD of the partition to be written with data is the second OSD; replicate the first write data request to the second OSD; and send a first report message to the management node after duration consumed for replicating the data block to the second OSD is obtained, where the first report message includes an identifier of the first OSD, an identifier of the second OSD, and health status information of the second OSD. The management node is configured to: receive the first report message; update, based on the first report message, an OSD health status record stored on the management node; and determine, based on the OSD health status record, that the second OSD is a sub-health OSD, where the OSD health status record includes health status information, reported by another OSD, of the second OSD.

When the first OSD replicates the to-be-written data block to the second OSD, the duration consumed for the replication is recorded as a reference for determining whether the second OSD is in sub-health. Therefore, compared with the prior art, the system provided in this application can detect a fault status of a node in the system more comprehensively, thereby improving accuracy of identifying a sub-health OSD.

According to a second aspect of this application, a method for identifying a sub-health OSD is provided, where the method is applied to the data storage system provided in the first aspect. The method includes the following steps:

receiving, by the first OSD, a first write data request, where the first write data request includes a data block that is to be written into a partition managed by the first OSD, and the corresponding partition to be written with data; determining, based on a partition allocation view, that a secondary OSD of the partition to be written with data is the second OSD; replicating the first write data request to the second OSD; and sending a first report message to the management node after duration consumed for replicating the data block to the second OSD is obtained, where the first report message includes an identifier of the first OSD, an identifier of the second OSD, and health status information of the second OSD; and receiving, by the management node, the first report message; updating, based on the first report message, an OSD health status record stored on the management node; and determining, based on the OSD health status record, that the second OSD is a sub-health OSD, where the OSD health status record includes health status information, reported by another OSD, of the second OSD.

For a same reason, the method provided in this application can detect a fault status of a node in the system more comprehensively, thereby improving accuracy of identifying a sub-health OSD.

According to a third aspect of this application, a Virtual Block System (Virtual Block System, VBS) is provided, so as to implement a function of a computing node in the foregoing system or method. The VBS includes an access interface, a service module, a client, and a reporting module. The access interface is configured to receive a first write data request, where the first write data request includes to-be-written data, a write location of the to-be-written data, a data length of the to-be-written data, and block device information of the to-be-written data. The service module is configured to: divide data included in the first write data request into data blocks; and compute, based on a write location, an offset, and the block device information of each data block, a partition into which each data block is to be written. The client is configured to: find, based on an I/O view, a primary OSD corresponding to the partition; send a second write data request to the primary OSD; and obtain duration consumed for sending the second write data request to the primary OSD, where the second write data request includes a to-be-written data block and a partition into which the to-be-written data block is to be written. The reporting module is configured to send a first report message to the management node, where the first report message includes an identifier of the VBS, an identifier of the primary OSD, and health status information of the primary OSD.

The VBS detects whether there is an exception in a path in which a write data request is delivered to the primary OSD, and reports a detection result to the management node, so that the management node can detect a health status of a node in the system more comprehensively.

According to a fourth aspect of this application, an OSD related in the foregoing system or method is provided. The OSD includes a data writing module, a replication module, and a reporting module. When serving as a primary OSD, the OSD receives a write data request from a computing node, where the write data request includes a to-be-written data block and a partition into which the to-be-written data block is to be written. Specifically, inside the OSD, the replication module is configured to: receive the write data request; replicate the write data request to a secondary OSD corresponding to the partition to be written with data included in the write data request; obtain duration consumed for replicating the to-be-written data block to the secondary OSD; and send the write data request to the data writing module. The data writing module is configured to: receive the write data request; and write the to-be-written data block included in the write data request into a persistent storage resource corresponding to the corresponding partition to be written with data. The reporting module is configured to send a first report message to the management node, where the first report message includes an identifier of the OSD, an identifier of the secondary OSD, and health status information of the secondary OSD.

Because the primary OSD feeds back a status of the secondary OSD to the management node in time, more comprehensive data is provided for management performed by the management node.

According to a fifth aspect of this application, a meta data controller (Meta Data Controller, MDC) is provided. The MDC is configured to implement a function of the management node in the foregoing system or method. The MDC includes a management module and a receiving module, where the receiving module is configured to receive a report message reported by a computing node or an OSD in a data storage system, where the report message includes an identifier of a reporter, an identifier of a reported OSD, and health status information of a reportee. The management module is configured to: update a stored OSD health status record based on the received report message; and determine, based on the updated OSD health status record, that one or more reported OSDs are sub-health OSDs.

According to a sixth aspect of this application, another method for identifying a sub-health OSD is provided, where the method is applied to a data storage system, the data storage system includes a management node, a plurality of storage nodes, and a plurality of computing nodes, a plurality of OSDs are deployed in the data storage system, and the plurality of OSDs are located on the plurality of storage nodes. The method is performed by using the management node. The method includes the following steps: receiving a first report message that is reported when at least one of the plurality of storage nodes processes a write data request, where the first report message includes an identifier of a reporting OSD, an identifier of a reportee, and health status information of a reported OSD, the reported OSD and the reporting OSD each are one of the plurality of OSDs, and the reporting OSD is not the reported OSD; and determining, based on the received first report message, that a first reported OSD is a sub-health OSD.

In a possible implementation of the sixth aspect of this application, the management node receives a second report message that is reported when at least one of the plurality of computing nodes processes a read/write data request, where the second report message includes an identifier of a reporter, an identifier of a reported OSD, and health status information of the reported OSD, the reported OSD is one of the plurality of OSDs, and the reporter is a computing node that reports the second report message. The management node determines, based on the received second report message, that a second reported OSD is a sub-health OSD.

In another possible implementation of the sixth aspect of this application, or with reference to the first implementation of the sixth aspect, in a second implementation of the sixth aspect, the management node determines, in the plurality of OSDs, a takeover OSD of the sub-health OSD; establishes a correspondence between the sub-health OSD and the takeover OSD; updates a partition allocation view based on the correspondence between the sub-health OSD and the takeover OSD, where the updated partition allocation view includes an updated I/O view; and sends the updated I/O view to the plurality of computing nodes and sends the updated partition allocation view to the takeover OSD and an OSD that has an active-standby relationship with the sub-health OSD. The management node receives a third report message, sent by the takeover OSD, of the sub-health OSD, where the third report message includes an identifier of the takeover OSD, an identifier of the sub-health OSD, and third health status information of the sub-health OSD, and the third health status information of the sub-health OSD is sent, based on a write data response returned by the sub-health OSD, after the takeover OSD synchronizes a received write data request to the sub-health OSD based on the updated partition allocation view. The management node determines, based on the received third report message of the sub-health OSD, that the sub-health OSD is restored to normal.

Optionally, the partition allocation view includes a partition, and a correspondence between a primary OSD of the partition and a secondary OSD of the partition. The updating a partition allocation view based on the correspondence between the sub-health OSD and the takeover OSD includes: if the sub-health OSD is the primary OSD of the partition, changing the original primary OSD into a secondary OSD, changing the original secondary OSD into a primary OSD, and associating the takeover OSD with the changed secondary OSD; or if the sub-health OSD is the secondary OSD of the partition, associating the takeover OSD with the secondary OSD.

Optionally, after the sub-health OSD is restored to normal, the method further includes: releasing, by the management node, the correspondence between the sub-health OSD and the takeover OSD, updating the partition allocation view, and sending the updated partition allocation view to the plurality of computing nodes, the takeover OSD, and an OSD that has an active-standby relationship with the sub-health node.

The health status information related in the foregoing aspects includes information indicating that an OSD is sub-healthy.

According to a seventh aspect of this application, a method for reporting health status information is provided, where the method may be performed by a VBS in a system. The method includes: receiving a first write data request, where the first write data request includes to-be-written data, a write location of the to-be-written data, a data length of the to-be-written data, and block device information of the to-be-written data; dividing data included in the first write data request into data blocks; and computing, based on a write location, an offset, and the block device information of each data block, a partition into which each data block is to be written; finding, based on an I/O view, a primary OSD corresponding to the partition; sending a second write data request to the primary OSD; obtaining duration consumed for sending the second write data request to the primary OSD, where the second write data request includes a to-be-written data block and a partition into which the to-be-written data block is to be written; and sending a first report message to the management node, where the first report message includes an identifier of the VBS, an identifier of the primary OSD, and health status information of the primary OSD.

Optionally, after the sending a second write data request to the primary OSD, the method further includes: receiving a write data response returned by the primary OSD; and obtaining, by comparing a time at which the second write data request is sent and a time at which the write data response is received, the duration consumed for sending the second write data request to the primary OSD.

Optionally, when the duration consumed for sending the second write data request to the primary OSD exceeds a threshold, the first report message is sent.

According to an eighth aspect of this application, another method for reporting health status information is provided, where the method may be performed by an OSD in a system. The method includes: receiving a write data request, where the write data request includes a to-be-written data block and a partition into which the to-be-written data block is to be written; replicating the write data request to a secondary OSD corresponding to the partition to be written with data included in the write request; obtaining duration consumed for replicating the to-be-written data block to the secondary OSD; and sending the write data request to a data writing module; writing the to-be-written data included in the write data request into a persistent storage resource corresponding to the corresponding partition to be written with data; and sending a first report message to the management node, where the first report message includes an identifier of the OSD, an identifier of the secondary OSD, and health status information of the secondary OSD.

Optionally, the method further includes: when writing the to-be-written data included in the write data request into a persistent storage resource corresponding to the corresponding partition to be written with data, obtaining duration consumed for writing the to-be-written data block into the persistent storage resource corresponding to the partition to be written with data; and sending a second report message to the management node, where the second report message includes the identifier of the OSD and health status information of the OSD.

Optionally, when it is determined that the duration consumed for replicating the to-be-written data block to the secondary OSD exceeds a threshold or it is determined that the duration consumed for writing the to-be-written data block into the persistent storage resource corresponding to the partition to be written with data exceeds the threshold, sub-health status information of the secondary OSD is sent to the reporting module. In other words, when it is determined that the duration consumed for replicating the to-be-written data block to the secondary OSD exceeds the threshold, the first report message is sent, or when it is determined that the duration consumed for writing the to-be-written data block into the persistent storage resource corresponding to the partition to be written with data exceeds the threshold, the second report message is sent.

Optionally, after the write data request is replicated to a secondary OSD, the method further includes: receiving a replication response returned by the secondary OSD; and obtaining, by comparing a time at which the write data request is replicated to the secondary OSD and a time at which the replication response is received, the duration consumed for replicating the to-be-written data block to the secondary OSD.

According to a ninth aspect of this application, an apparatus configured to implement the sixth aspect, the seventh aspect, and the eighth aspect is provided. The apparatus includes a processor and a memory, and the processor and the memory are connected through a bus, where the memory is configured to store a computer operation instruction, and may be specifically a high-speed RAM memory or a non-volatile memory (nonvolatile memory). The processor is configured to execute the computer operation instruction stored in the memory. The processor may be specifically a central processing unit (central processing unit, CPU), an application-specific integrated circuit (Application Specific Integrated Circuit, ASIC), or one or more integrated circuits configured to implement this aspect of the present invention. The processor executes the computer operation instruction stored in the memory to perform the method in the sixth aspect, the seventh aspect, or the eighth aspect, so as to implement a function of the foregoing MDC, VBS, or OSD in a data storage system.

According to a tenth aspect of this application, a storage medium is provided, so as to store the computer operation instruction mentioned in the ninth aspect. When the operation instruction is executed by a computer, the method in the sixth aspect, the seventh aspect, or the eighth aspect can be performed, so as to implement a function of the foregoing MDC, VBS, or OSD in a data storage system.

BRIEF DESCRIPTION OF DRAWINGS

To describe the technical solutions in the embodiments of the present invention more clearly, the following briefly describes the accompanying drawings required for the embodiments.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
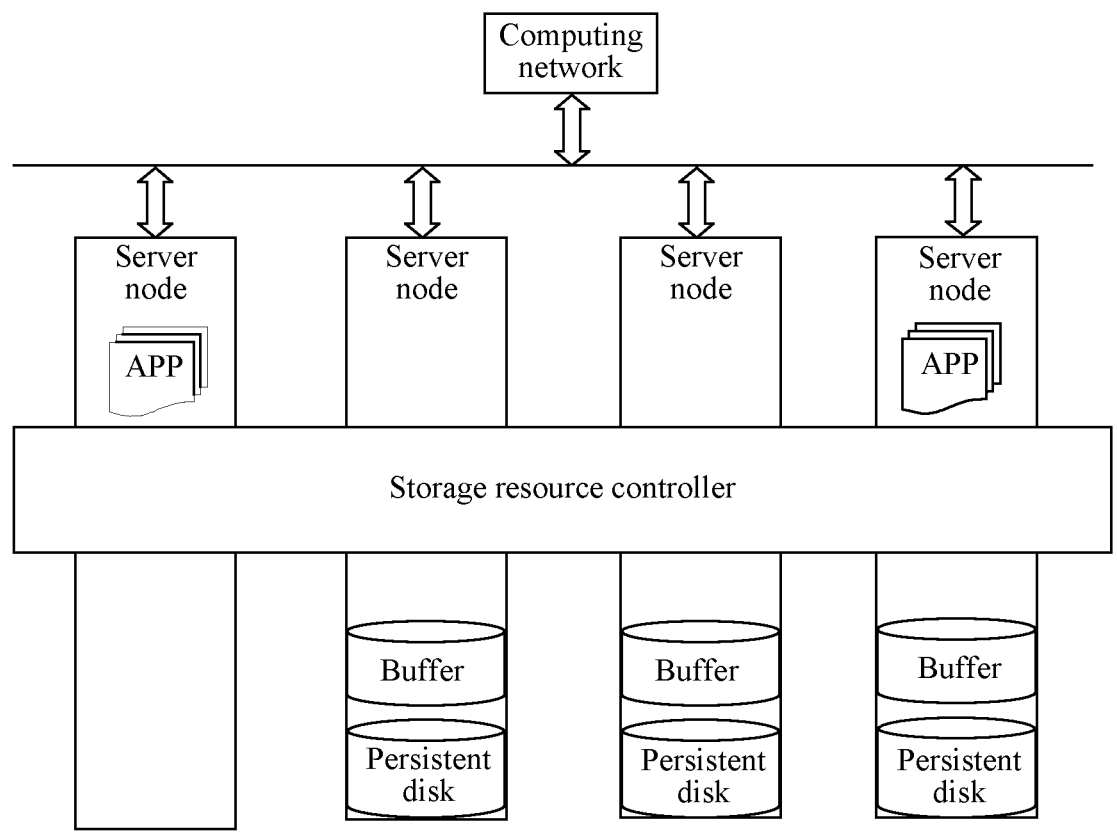
FIG. 1 is a schematic structural diagram of a distributed storage system.

An embodiment of the present invention relates to a data storage system. As shown in FIG. 1, the data storage system includes two or more server nodes. Each server node can provide a computing resource and/or a storage resource. The data storage system is configured to provide the computing resource and the storage resource to different applications for use, where the application may be a virtual machine, a database, or the like. The foregoing server nodes may perform data communication through a computing network (for example, a high-speed data exchange network). A distributed storage controller is run on the data storage system. A storage control function module running on each server node is collectively referred to as the distributed storage controller. The distributed storage controller uses a distributed algorithm to virtualize storage resources (persistent storage resources and buffer resources) in the server nodes into a shared storage resource pool, so as to provide shared use for applications in the data storage system. When an application is run on the data storage system, related data of the application may be stored on a storage resource of the data storage system, or related data of the application may be read from a storage resource of the data storage system. It should be noted that FIG. 1 is merely an example of the data storage system. In actual application, more server nodes can be deployed.

In this embodiment of the present invention, the distributed storage controller may be implemented by a software module installed on a hardware device of a server. Specifically, the distributed storage controller can be functionally divided into the following parts: a Meta Data Controller, a Virtual Block System and an OSD.

The meta data controller (Meta Data Controller, MDC) is mainly configured to allocate, to each OSD in the data storage system, a partition (Partition) corresponding to a physical storage resource managed by the OSD, and establish a partition allocation view. When a correspondence between the OSD in the data storage system and the partition is changed, the MDC is further configured to update the partition allocation view. A partition means a logical mapping of a physical storage resource in a storage layer. The physical storage resource herein is usually a persistent storage resource, and the persistent storage resource may be provided by a mechanical hard disk such as a hard disk drive HDD, a solid state disk SSD, or a storage class memory (Storage Class Memory, SCM) device. The partition allocation view includes a correspondence between a partition and an OSD to which the partition belongs. To meet an availability requirement of a user, the data storage system usually uses multi-copy storage. In actual application, there may be three copies or another multi-copy manner. In a multi-copy storage scenario, one partition has a correspondence with a plurality of OSDs. In addition, one of the plurality of OSDs serves as a primary OSD of the partition, and another OSD serves as a secondary OSD of the partition. In this scenario, the partition allocation view includes a correspondence between the partition, the primary OSD of the partition, and the secondary OSD of the partition. The partition allocation view includes an I/O view. It can be understood that the I/O view is a sub-table of the partition allocation view. The I/O view is used to record and store a correspondence between a partition and an OSD. The Virtual Block System (Virtual Block System, VBS), as a driver layer for storage, is configured to provide a block access interface to an application that accesses the data storage system, and accomplish read/write logic of block storage data. An I/O view is stored on the VBS. The I/O view includes correspondences between all partitions and primary OSDs corresponding to the partitions. Based on the I/O view, data is forwarded to a corresponding OSD or data is read from a corresponding OSD.

The OSD is configured to: receive a read/write data request, and read or write data, based on the read/write data request, from or to a persistent storage resource corresponding to a partition managed by the OSD. A partition allocation view is stored on the OSD. The partition allocation view includes correspondences between all partitions in the data storage system and active and secondary OSDs corresponding to the partitions. Based on the partition allocation view, the OSD can find a secondary OSD corresponding to a partition of to-be-read data or to-be-written data.

Usually, for a specific deployment manner of a data storage system, different configuration files may be selected based on user requirements. The configuration file includes a deployment policy of the foregoing function modules, partition specifications (to be specific, a quantity of parts into which each hard disk is divided) of the data storage system, address information (including MDC, VBS, and OSD address information) for mutual communication between different server nodes, and the like. In actual deployment, each server node runs different function modules of the distributed storage controller based on the deployment policy in the configuration file. To be specific, based on the deployment policy, different function modules of the distributed storage controller can be run on different server nodes, and each server node can run all function modules of the distributed storage controller or run some function modules of the distributed storage controller. For example, the foregoing MDC may be deployed only on a specific server node of the data storage system; the foregoing VBS may be deployed in each server node that is in the data storage system and that has a computing resource; the foregoing OSD may be deployed on each server node that is in a cluster system and that has a storage resource. Based on an actual requirement, one or more OSDs can be deployed on one server node.

For ease of description, in the following, a server node on which the MDC is deployed is referred to as a management node. In addition, a server node that can provide a computing resource is referred to as a computing node, and a server node that can provide a storage resource is referred to as a storage node. It can be understood that, in the deployment policy in the foregoing example, the OSD is deployed on the storage node, and the VBS is deployed on the computing node. The computing node, the storage node, and the management node mentioned herein are logical concepts. Physically, a server node may be a computing node, a storage node, or a management node.

In an initialization phase, a user imports a configuration file into a data storage system by using a management end of the system. An MDC establishes a partition allocation view of the data storage system based on the imported configuration file. The partition allocation view includes a mapping relationship between an OSD in the data storage system and a partition. In a multi-copy storage scenario, the partition allocation view includes a correspondence between a partition, a primary OSD of the partition, and a secondary OSD of the partition; an I/O view includes a correspondence between a partition and a primary OSD of the partition.

After an OSD on a server node is activated, the OSD requests the MDC for a partition allocation view. Based on the request, the MDC sends an allocated partition allocation view to the OSD. After a VBS on a server node is activated, the VBS requests the MDC for an I/O view. Based on the request, the MDC sends an allocated I/O view to the corresponding VBS. It can be understood that the MDC may send, after a partition allocation view is generated, the partition allocation view to the OSD and an I/O view in the partition allocation view to the VBS, or the MDC may send, after a partition allocation view is updated, an updated partition allocation view to the OSD and an updated I/O view to the VBS.

Figure 2:
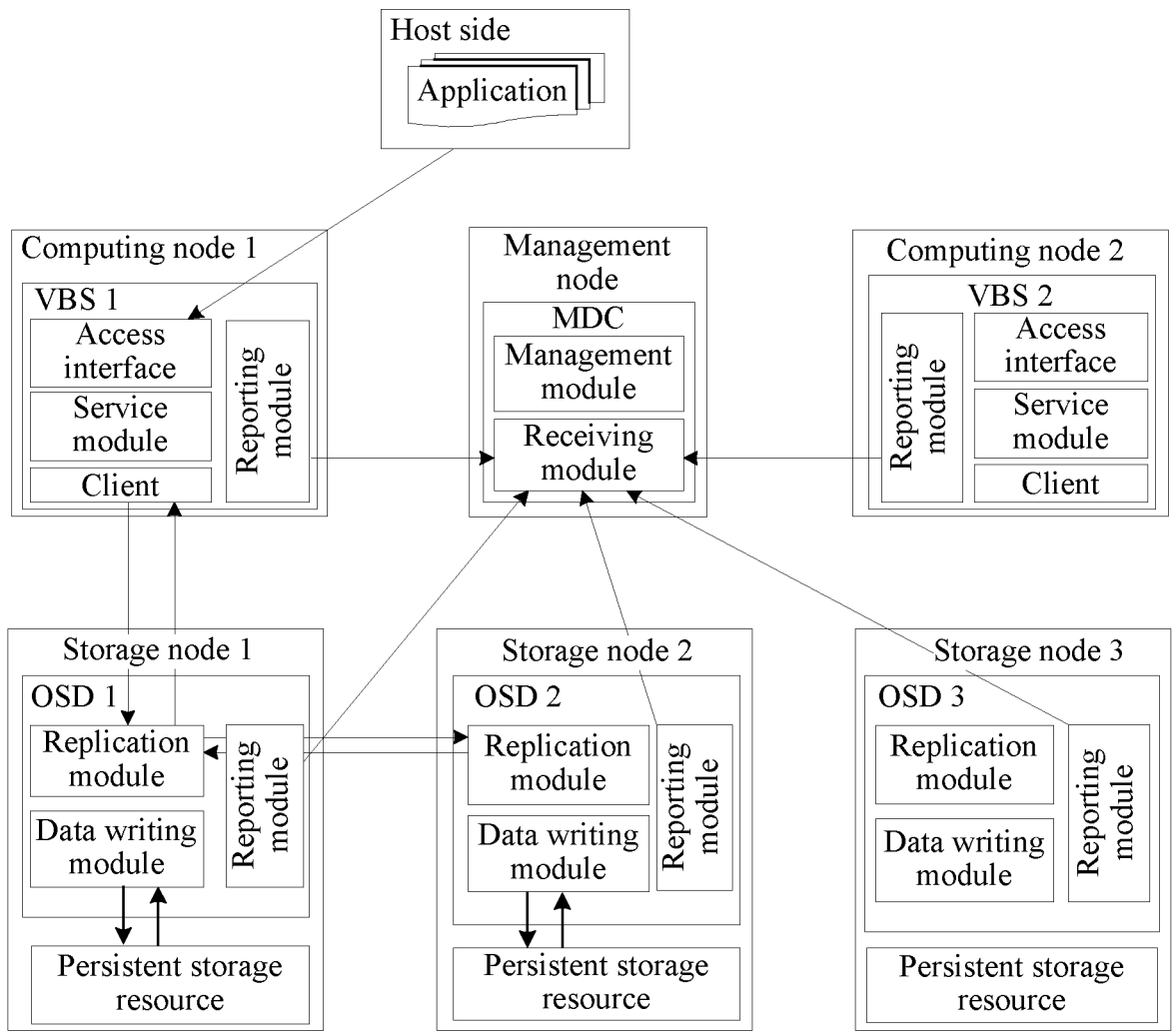
FIG. 2 is a schematic structural diagram of a data storage system according to an embodiment of the present invention.

An embodiment of the present invention is implemented on a basis of the foregoing. Referring to FIG. 2, a data storage system is provided in this embodiment of the present invention. The system includes a management node and a plurality of storage nodes, a plurality of OSDs are deployed in the system, the plurality of OSDs are located on the plurality of storage nodes, and the plurality of OSDs include a first OSD and a second OSD. The first OSD is configured to: receive a first write data request, where the first write data request includes a to-be-written data block and a corresponding partition to be written with data; determine, based on a partition allocation view, that a secondary OSD of the partition to be written with data is the second OSD; replicate the first write data request to the second OSD; and send a first report message to the management node after duration consumed for replicating the data block to the second OSD is obtained, where the first report message includes an identifier of the first OSD, an identifier of the second OSD, and health status information of the second OSD. The management node is configured to: receive the first report message; update, based on the first report message, an OSD health status record stored on the management node; and determine, based on the OSD health status record, that the second OSD is a sub-health OSD, where the OSD health status record includes health status information, reported by another OSD, of the second OSD. The another OSD mentioned herein is an OSD, other than the first OSD and the second OSD, in the plurality of OSDs.

Optionally, the computing node is configured to: receive a second write data request; divide to-be-written data included in the second write data request into at least one to-be-written data block; determine a partition into which each data block in the at least one data block is to be written; determine, based on an I/O view, that a primary OSD that processes the to-be-written data block includes the first OSD; send the first write data request to the first OSD; and send a second report message to the management node after duration consumed for sending the first write data request to the first OSD is obtained, where the second report message includes an identifier of the computing node, the identifier of the first OSD, and health status information of the first OSD. The management node is further configured to: update, based on the second report message, the OSD health status record recorded on the management node; and determine, based on the OSD health status record, that the first OSD is a sub-health OSD, where the OSD health status record includes health status information, reported by another OSD, of the first OSD.

Optionally, the computing node is configured to: receive a first read data request; determine a partition in which each to-be-read data block that is to be read by the first read data request is located; determine, based on an I/O view, that a primary OSD that processes the to-be-read data block includes the first OSD; send a second read data request to the first OSD; and send a second report message to the management node after duration consumed for sending the second read data request to the first OSD is obtained, where the second report message includes an identifier of the computing node, the identifier of the first OSD, and health status information of the first OSD, and the second read data request includes the partition in which the to-be-read data block is located. The management node is further configured to: receive the second report message; update, based on the second report message, the OSD health status record stored on the management node; and determine, based on the OSD health status record, that the first OSD is a sub-health OSD, where the OSD health status record includes health status information, reported by another OSD, of the first OSD.

Optionally, the first OSD is further configured to: write, into a persistent storage resource corresponding to the corresponding partition to be written with data, the data block that is to be written into a partition managed by the first OSD; and send a third report message to the management node after duration consumed for writing the data block into the persistent storage resource is obtained, where the third report message includes the identifier of the first OSD and health status information of the first OSD. The management node is configured to determine, based on the third report message, that the first OSD is a sub-health OSD.

Optionally, the management node is configured to: determine, in the plurality of OSDs, a takeover OSD of the sub-health OSD; establish a correspondence between the sub-health OSD and the takeover OSD; update the partition allocation view based on the correspondence between the sub-health OSD and the takeover OSD, where the updated partition allocation view includes an updated I/O view; and send the updated I/O view to the plurality of computing nodes and send the updated partition allocation view to the takeover OSD and an OSD that has an active-standby relationship with the sub-health OSD, where the takeover OSD is different from the first OSD and the second OSD. The computing node is configured to: receive a third write data request; divide to-be-written data included in the third write data request into at least one to-be-written data block; determine a partition into which each to-be-written data block in the at least one data block is to be written; determine, based on the I/O view, that a primary OSD that processes the at least one to-be-written data block includes the third OSD; and send a fourth write data request to the third OSD, where the fourth write data request includes a data block that is to be written into a partition managed by the third OSD, and the corresponding partition to be written with data, and the third OSD is one of the plurality of OSDs, and is different from the takeover OSD. After receiving the third write data request, the third OSD replicates the third write data request to the takeover OSD based on the updated partition allocation view, where in the updated partition allocation view, a secondary OSD corresponding to the partition to be written with data included in the third write data request is the sub-health node. The takeover OSD is further configured to synchronize the received third write data request to the sub-health OSD based on the updated partition allocation view.

Optionally, the takeover OSD is further configured to send the third report message to the management node after duration consumed for synchronizing the third write data request to the sub-health OSD is obtained, where the third report message includes an identifier of the takeover OSD, an identifier of the sub-health OSD, and third health status information of the sub-health OSD. The management node is further configured to: update, based on the third report message, the OSD health status record recorded on the management node; and determine, based on an OSD health status record, that the sub-health OSD is restored to normal, where the OSD health status record includes health status information, reported by another OSD, of the sub-health OSD.

Optionally, the first OSD is configured to: receive a replication response returned by the second OSD; and obtain, by comparing a time at which the first write data request is sent and a time at which the replication response is received, the duration consumed for replicating the data block to the second OSD.

The duration consumed for synchronizing the third write data request to the sub-health OSD may also be obtained, after a synchronization response returned by the sub-health OSD is received, by comparing a time at which the third write data request is sent and a time at which the synchronization response is received.

Optionally, the computing node is further configured to: receive a first write data response returned by the first OSD; and obtain, by comparing a time at which the first write data request is sent and a time at which the first write data response is received, the duration consumed for sending the first write data request to the first OSD.

Optionally, the computing node is further configured to: receive a read data response that is returned by the first OSD for the second read data request; and obtain, by comparing a time at which the second read data request is sent and a time at which the read data response is received, the duration consumed for sending the second read data request to the first OSD.

It can be understood that the foregoing health status information may include information indicating that an OSD is sub-healthy, or may be the foregoing consumed duration. The foregoing first report message, second report message, or third report message may be a heartbeat message.

A function of the foregoing management node may be implemented by using an MDC. Referring to FIG. 2, in a possible implementation, the MDC includes a receiving module and a management module, where the receiving module is configured to receive a report message reported by a computing node or an OSD in a data storage system, where the report message includes an identifier of a reporter, an identifier of a reported OSD, and health status information of a reportee; and the management module is configured to: update a stored OSD health status record based on the received report message; and determine, based on the updated OSD health status record, that one or more reported OSDs are sub-health OSDs.

Optionally, the management module is configured to: determine, in the data storage system, a takeover OSD of the sub-health OSD; establish a correspondence between the sub-health OSD and the takeover OSD; update a partition allocation view based on the correspondence between the sub-health OSD and the takeover OSD, where the updated partition allocation view includes an updated I/O view; and send the updated I/O view to the computing node and send the updated partition allocation view to the takeover OSD and an OSD that has an active-standby relationship with the sub-health OSD.

Optionally, the receiving module is further configured to receive a first report message of the sub-health OSD sent by the takeover OSD, where the first report message includes an identifier of the takeover OSD, an identifier of the sub-health OSD, and first health status information of the sub-health OSD, and the first health status information of the sub-health OSD is sent, based on a write data response returned by the sub-health OSD, after the takeover OSD synchronizes a received write data request to the sub-health OSD based on the updated partition allocation view. The management module is configured to: update the stored OSD health status record based on the received first report message of the sub-health OSD; and determine, based on the updated OSD health status record, that the sub-health OSD is restored to normal.

A function of the foregoing computing node is implemented by a Virtual Block System (Virtual Block System, VBS). Referring to FIG. 2, the VBS, as a driver layer for storage, is used to provide a block access interface to an application that accesses the data storage system and accomplish read/write logic of block storage data. An I/O view is stored on the VBS. The I/O view includes correspondences between all partitions and primary OSDs corresponding to the partitions. Based on the I/O view, data is forwarded to a corresponding OSD or data is read from a corresponding OSD.

Referring to FIG. 2, in a possible implementation, the VBS includes an access interface, a service module, a client, and a reporting module. The access interface is configured to receive a first write data request, where the first write data request includes to-be-written data, a write location of the to-be-written data, a data length of the to-be-written data, and block device information of the to-be-written data. The service module is configured to: divide data included in the first write data request into data blocks; and compute, based on a write location, an offset, and the block device information of each data block, a partition into which each data block is to be written. The client is configured to: find, based on an I/O view, a primary OSD corresponding to the partition; send a second write data request to the primary OSD; and obtain duration consumed for sending the second write data request to the primary OSD, where the second write data request includes a to-be-written data block and a partition into which the to-be-written data block is to be written. The reporting module is configured to send a first report message to the management node, where the first report message includes an identifier of the VBS, an identifier of the primary OSD, and health status information of the primary OSD.

Optionally, the client is further configured to: receive a write data response returned by the primary OSD; and obtain, by comparing a time at which the second write data request is sent and a time at which the write data response is received, the duration consumed for sending the second write data request to the primary OSD.

Optionally, the VBS further includes a determining module (not shown in the figure). The determining module is configured to: when determining that the duration consumed for sending the second write data request to the primary OSD exceeds a threshold, send sub-health status information of the secondary OSD to the reporting module.

If an application sends a read data request, the access interface is further configured to receive the read data request, where the read data request includes a start location of to-be-read data, a data length of the to-be-read data, and block device information of the to-be-read data. The service module is further configured to: divide the to-be-read data into data blocks, and compute, based on a starting location, an offset, and block device information of each data block, a partition in which each data block is located. The client is configured to: find, based on an I/O view, a primary OSD corresponding to the partition, and send the read data request to the primary OSD, where the read data request includes a partition in which the to-be-read data block is located.

The access interface may be a Small Computer System Interface (Small Computer System Interface, SCSI) based block device access interface, namely, a SCSI interface. The reporting module may be a heartbeat module.

The I/O view may be actively delivered by the MDC to the VBS, or may be actively obtained by the VBS from the MDC. Alternatively, it may be that the MDC delivers the partition allocation view to the VBS, and the VBS generates the I/O view based on the received partition allocation view.

Referring to FIG. 2, in a possible implementation, the foregoing OSD may include a replication module, a data writing module, and a reporting module. The replication module is configured to: receive a write data request, where the write data request includes a to-be-written data block and a partition into which the to-be-written data is to be written; replicate the write data request to a secondary OSD corresponding to the partition to be written with data included in the write request; obtain duration consumed for replicating the to-be-written data block to the secondary OSD; and send the write data request to the data writing module. The data writing module is configured to: receive the write data request; and write the to-be-written data included in the write data request into a persistent storage resource corresponding to the corresponding partition to be written with data. The reporting module is configured to send a first report message to the management node, where the first report message includes an identifier of the OSD, an identifier of the secondary OSD, and health status information of the secondary OSD.

Optionally, the data writing module is further configured to obtain duration consumed for writing the to-be-written data block into the persistent storage resource corresponding to the partition to be written with data. The reporting module is further configured to send a second report message to the management node, where the second report message includes the identifier of the OSD and health status information of the OSD.

Optionally, the OSD further includes a determining module (not shown in the figure), where the determining module is configured to: when determining that the duration consumed for replicating the to-be-written data block to the secondary OSD exceeds a threshold or determining that the duration consumed for writing the to-be-written data block into the persistent storage resource corresponding to the partition to be written with data exceeds the threshold, send sub-health status information of the secondary OSD to the reporting module.

Optionally, the replication module is further configured to: receive a replication response returned by the secondary OSD; and obtain, by comparing a time at which the write data request is replicated to the secondary OSD and a time at which the replication response is received, the duration consumed for replicating the to-be-written data block to the secondary OSD.

Optionally, the foregoing data writing module may be an asynchronous I/O module, the foregoing replication module may be a replicated state machine (Replicated State Machine, RSM), and the foregoing reporting module may be a heartbeat module.

It can be understood that the receiving module mentioned in the foregoing embodiment may also be a heartbeat module. The heartbeat module related in the present invention is a module configured to receive and send a heartbeat message. It can be understood that when the reporting module is a heartbeat module, information sent by the reporting module is carried in a heartbeat message for reporting. Correspondingly, in the MDC, a heartbeat message is also received by a heartbeat module.

FIG. 2 shows a logical structural diagram of a data storage system 100 according to an embodiment of the present invention. As shown in FIG. 2, the data storage system 100 includes: computing nodes 1 and 2, storage nodes 1, 2, and 3, and a management node. For ease of description, that each partition corresponds to one primary OSD and one secondary OSD and there is one OSD on each storage node is used as an example in the following method embodiments. In addition, for a partition 1, a primary OSD is an OSD 1 on the storage node 1, and a secondary OSD is an OSD 2 on the storage node 2. For a partition 2, a primary OSD is the OSD 2 on the storage node 2, and a secondary OSD is an OSD 3 on the storage node 3. There are other partitions in the system. For brevity, details are not described herein. Specifically, in this embodiment, a correspondence between the partition 1, the OSD 1, and the OSD 2 and a correspondence between the partition 2, the OSD 2, and the OSD 3 are stored on the OSD. A correspondence between the partition 1 and the OSD 1 and a correspondence between the partition 2 and the OSD 2 are stored in an I/O view stored on a VBS. It can be understood that for implementation details related in the foregoing system embodiment and apparatus embodiment, refer to the following method embodiment.

Figure 3:
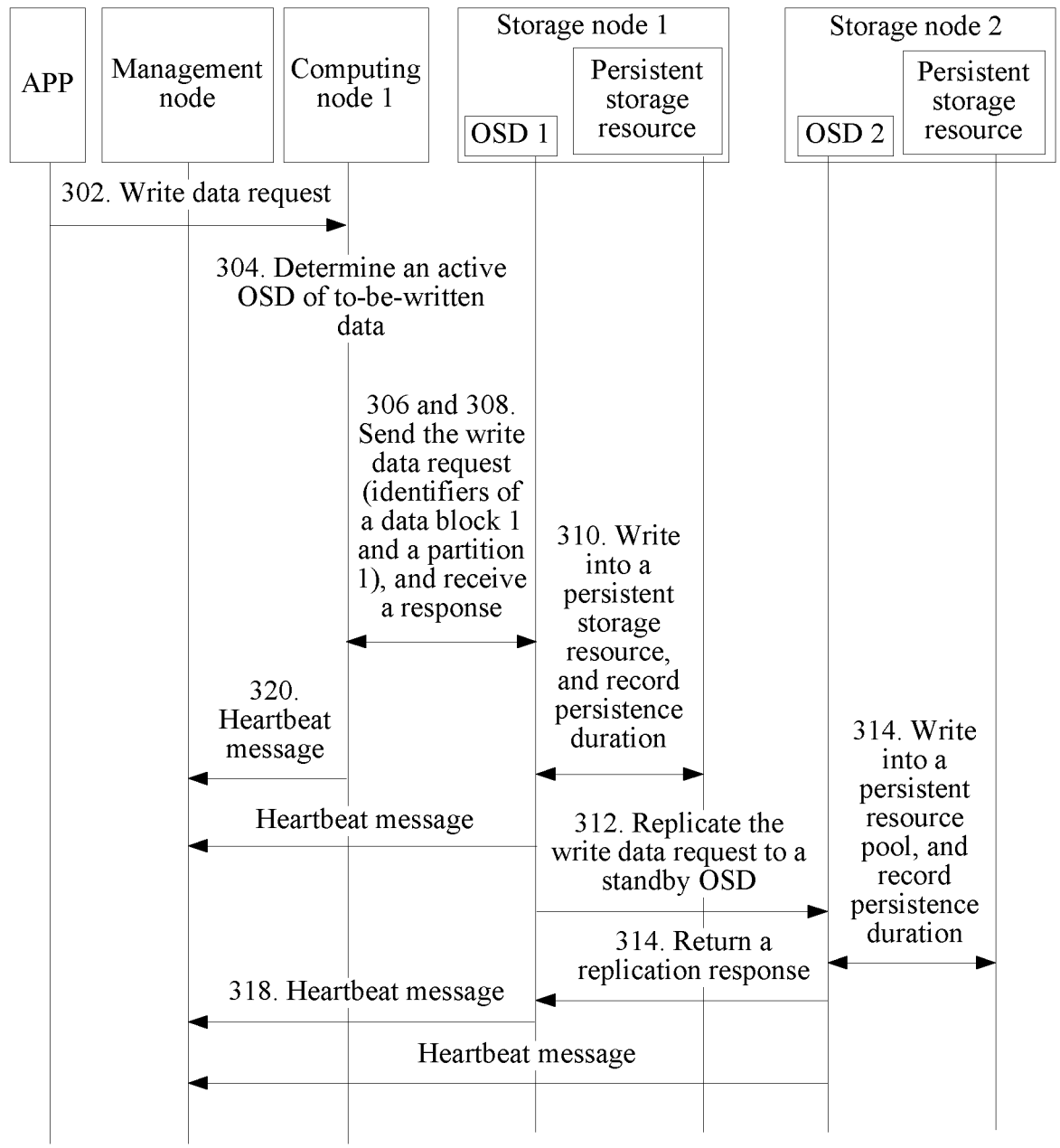
FIG. 3 is a schematic flowchart of a method for identifying a sub-health OSD according to an embodiment of the present invention.

A method for identifying a sub-health OSD is provided in an embodiment of the present invention, and is applied to the distributed storage system shown in FIG. 2. Referring to FIG. 3, the method includes the following steps.

S302: After any application running on server cluster system initiates a write data operation, a VBS in the computing node 1 receives a write data request. The write data request includes to-be-written data, a write location of the to-be-written data, a data length of the to-be-written data, and block device information of the to-be-written data. The write data request herein may be a write I/O request.

S304: The VBS determines, based on the write location of the to-be-written data, the data length of the to-be-written data, and the block device information of the to-be-written data included in the write data request, a primary OSD that processes the to-be-written data.

A specific process of this step may include: dividing, by the VBS, the to-be-written data into a plurality of data blocks based on a preset length, computing, based on a consistent hashing algorithm, partition information corresponding to each data block, and then finding, based on a stored I/O view, a primary OSD corresponding to each data block. It can be understood that the to-be-written data may alternatively be less than a preset length, and the VBS classifies the to-be-written data into one data block based on the preset length. The to-be-written data may be divided into one or more data blocks. Therefore, there may be one or more primary OSDs corresponding to the to-be-written data.

In this embodiment, it is assumed that the to-be-written data is divided into two data blocks: a data block 1 and a data block 2. It is obtained, through calculation based on the consistent hashing algorithm, that a partition corresponding to the data block 1 is the partition 1 and a partition corresponding to the data block 2 is the partition 2. It can be learned based on the I/O view that a primary OSD corresponding to the partition 1 is the OSD 1 and a primary OSD corresponding to the partition 2 is the OSD 2.

S306: The VBS separately sends a write data request to a primary OSD corresponding to each data block, where the write data request includes a to-be-written data block that is to be written into the primary OSD and a partition into which the to-be-written data block is to be written; and records a time at which the write data request is sent.

To be specific, the VBS separately sends, to the OSD 1 on the storage node 1, a write data request that includes identifiers of the data block 1 and the partition 1, and sends, to the OSD on the storage node 2, a write data request that includes identifiers of the data block 2 and the partition 2. The following uses a processing process of the data block 1 as an example to describe a specific processing process in this embodiment of the present invention.

S308: After receiving a write data request that includes a data block 1, the OSD 1 on the storage node 1 returns a write data response to the VBS 1 that sends the write data request.

S310: After receiving the write data request that includes the data block 1 and the partition 1, the OSD 1 invokes a system invoking interface of an operating system (Operating System, OS) running on the storage node 1, to write the data block 1 into a persistent storage resource corresponding to the partition 1 managed by the OSD 1, and records a time at which the data block 1 is written. The OSD writes the data block 1 into the persistent storage resource managed by the OSD and returns a write response to the OSD 1. When receiving the write response returned by the OS, the OSD 1 obtains, by comparing the time at which the data block 1 is written and a time at which a corresponding write response is received, duration consumed for writing the data block 1 into the persistent storage resource managed by the OSD 1.

In another possible implementation, the health status information of the OSD 2 is information indicating that the OSD 2 is sub-healthy. In this implementation, the OSD 1 determines, based on the duration consumed for replicating the data to the standby storage node, whether the OSD 2 is in a sub-health state or in a health state. For example, when duration consumed for replicating the data block 1 to the standby storage node exceeds a particular threshold, it is considered that the OSD 2 is in the sub-health state. When the OSD 2 is in the sub-health state, the ID of the OSD 2 and the information indicating that the OSD 2 is in the sub-health state may be included in a heartbeat message reported to the management node by the storage node 1 in which the OSD 1 is located. The information indicating the sub-health state may be a sub-health type. The sub-health type may also be referred to as a fault level.

Usually, an identifier of the reporter OSD 1 is carried in a packet header of the heartbeat message reported to the management node. The ID of the OSD 2 and the information indicating that the OSD 2 is in the sub-health state are carried by using the following packet field:

```
typedef struct PACKFLAG osd_heartbeat_request
{
    required dsw_u16 osd_num;
    required dsw_u8 type;
    required dsw_u32 osd_array[0];
} osd_heartbeat_request_t;
where osd_num is a quantity of reported OSDs, and type means that the reported
OSDs are sub-healthy; and
osd_array is a list of the reported OSDs.
```

S312: After receiving the write data request that includes the data block 1, the OSD 1 replicates the write data request to the secondary OSD of the partition 1 based on a partition allocation view, and records a time at which the write data request is sent.

In this embodiment, because multi-copy storage is used, it can be learned from the partition allocation view stored in the OSD 1 that the primary OSD corresponding to the partition 1 is the OSD 1 on the storage node 1, and the secondary OSD corresponding to the partition 1 is the OSD 2 on the storage node 2. Therefore, after receiving the write data request that includes the data block 1, the OSD 1 on the storage node 1 replicates the write data request to the OSD 2, and records the time at which the write data request is sent.

S314: After receiving the write data request, the OSD 2 writes the data block 1 in the write data request into a persistent storage resource managed by the OSD 2, and after persistence is completed, returns a replication response to the OSD 1. In addition, the OSD 2 may also record duration in which the OSD 2 writes the data block 1 into the persistent storage resource managed by the OSD 2.

S316: After receiving the replication response returned by the OSD 2, the OSD 1 compares the recorded time at which the write data request is sent to the OSD 2 with a time at which the replication response is received, so as to obtain duration consumed for replicating the data to the secondary OSD.

S318: The OSD 1 may report an ID of the OSD 2 and health status information of the OSD 2 to a management node. The health status information of the OSD 2 is used to reflect a health status of the OSD 2.

In a possible implementation, the health status information of the OSD 2 is duration consumed for replicating the data to a standby storage node.

It can be understood that in the foregoing S310, after the OSD 1 obtains the duration consumed for writing the data block 1 into the persistent storage resource managed by the OSD 1, the OSD 1 may report the ID of the OSD 1 and health status information of the OSD 1 to the management node. The health status information of the OSD 1 is used to reflect a health status of the OSD 1. The health status information of the OSD may be the duration consumed for replicating the data to the standby storage node, or may be information indicating that the OSD 1 is in a sub-health state. The OSD 1 can determine the health status of the OSD 1 based on the duration consumed for writing the data block 1 into the persistent storage resource managed by the OSD 1. For example, when the duration consumed for writing the data block 1 into the persistent storage resource managed by the OSD 1 exceeds a particular threshold, the OSD 1 determines that the OSD 1 is in the sub-health state. When the OSD 1 is in the sub-health state, the ID of the OSD 1 and the information indicating that the OSD 1 is in the sub-health state may be included in a heartbeat message reported to the management node by the storage node 1 in which the OSD 1 is located.

In a similar method, in the foregoing S314, after obtaining the duration consumed for writing the data block 1 into the persistent storage resource managed by the OSD 2, the OSD 2 may also report the ID of the OSD 2 and the health status information of the OSD 2 to the management node. With reference to the foregoing examples, the OSD 1 and the OSD 2 can use an existing heartbeat message to report the health status information of the OSD 1 and the OSD 2 respectively.

Certainly, the foregoing health status information of the OSD may alternatively be reported by using another message. No limitation is imposed in the present invention.

S320: After receiving the write data response sent by the OSD 1, the VBS 1 compares a time at which the VBS 1 sends the write data request and a time at which the VBS 1 receives the write data response, so as to obtain duration for sending the write data request to the primary OSD.

After obtaining the duration for sending the write data request to the primary OSD, the VBS 1 can report the ID of the OSD 1 and the health status information of the OSD 1 to the management node. The health status information of the OSD 1 is used to reflect the health status of the OSD 1. The health status information of the OSD 1 may be the duration for sending the write data request to the primary OSD, or may be the information indicating that the OSD 1 is in the sub-health state. The OSD 1 can determine the health status of the OSD 1 based on the duration for sending the write data request to the primary OSD. For example, when the duration for sending the write data request to the primary OSD exceeds a particular threshold, it is determined that the OSD 1 is in the sub-health state. When the OSD 1 is in the sub-health state, the ID of the OSD 1 and the information indicating that the OSD 1 is in the sub-health state may be included in a heartbeat message reported to the management node by the computing node 1 in which the VBS 1 is located.

Usually, an identifier of the reporter is carried in a packet header of the heartbeat message reported to the management node. The ID of the OSD 1 and the information indicating that the OSD 1 is in the sub-health state are carried by using the following packet field.

format in the present invention. Based on different senders, the received report information may be classified into the following three types: health status information, reported by a computing node, of an OSD, health status information, reported by a storage node, of an OSD on another storage node, and health status information, reported by a storage node, of an OSD on the storage node. As described above, the reported health status information may be indication information indicating that an OSD is in a sub-health state, or may be a delay in processing a read/write data request.

Herein, the delay in processing a read/write data request may include duration consumed by an OSD for writing data into a persistent storage resource managed by the OSD, duration consumed by a primary OSD for replicating the data to a secondary OSD, and duration consumed by a VBS for sending the read/write data request to the primary OSD.

It can be understood that when data is read from a persistent storage resource, the delay in processing a read/write data request may include duration consumed by an OSD for reading the data from the persistent storage resource managed by the OSD, and duration consumed by a VBS for sending the read/write data request to the primary OSD.

After receiving health status information, reported by each node, of an OSD, the management node may manage the OSD based on a specified management policy. In the following example, the health status information reported by each node is indication information indicating that the OSD

```
typedef struct PACKFLAG unhealthy_osd_list_req_s
{
   required dsw_u16 osd_num;
   required dsw_u8 type;
   required dsw_u32 osd_array[0];
}unhealthy_osd_list_req_t;
where osd_num is a quantity of reported OSDs, and type means that the reported
OSDs are sub-healthy; and
osd_array is a list of the reported OSDs.
```

It can be understood that there is no strict time sequence between a time at which the OSD reports a heartbeat message and a time at which the computing node reports a heartbeat message.

S322: The management node receives health status information, reported by the foregoing storage node and/or computing node, of the storage node, determines a health status of the OSD in the data storage system based on the received health status information, and performs corresponding processing.

It can be understood that there may be a plurality of computing nodes and storage nodes in the data storage system, where each computing node and each storage node may report, when processing a write data request or a read data request, health status information of an OSD related to the write data request or the read data request. In addition, in actual deployment, one OSD may serve as a primary OSD for a plurality of partitions, or serve as a secondary OSD for a plurality of other partitions.

Therefore, the management node may receive a plurality of heartbeat messages. A health status record table may be set on the management node to record an OSD that is in the sub-health state in the data storage system. A correspondence between an identifier of the sub-health OSD and an identifier of the reporter that reports the sub-health OSD may be recorded. No limitation is imposed on a recorded is in the sub-health state. The management node separately manages the foregoing three types of information.

For the health status information, reported by a computing node, of an OSD, the management node performs the following steps.

S322-11: Obtain a quantity of computing nodes in the data storage system that have processed read/write data requests in a time period, and record the quantity of the computing nodes as X.

S322-12: In n primary OSDs related to all the foregoing read/write data requests, count a quantity of computing nodes that report that each primary OSD is in the sub-health state, and record the quantity of the computing nodes that report each primary OSD as Yi, where i is an integer from 1 to n.

Alternatively, in storage nodes related to all the foregoing read/write data requests, obtain, through statistics collection, a primary OSD that is reported to be sub-healthy by a largest quantity of computing nodes, and record a quantity of the computing nodes that report the primary OSD as Y.

S322-13: For each primary OSD, calculate whether a proportion (Yi/X) of the computing nodes that report the sub-health state of the primary OSD is in a preset range, and if the proportion (Yi/X) is in the preset range, determine that the primary OSD is in the sub-health state, and perform permanent isolation or online temporary isolation on the primary OSD based on a fault level of the primary OSD. The fault level can be determined based on factors such as a value of the delay in processing the read/write data request and a proportion of computing nodes affected by the delay. No limitation is imposed in the present invention.

Alternatively, if Y is reported in S322-12, the proportion of the computing nodes may be Y/X.

For health status information, reported by a storage node, of an OSD on another storage node, the management node performs the following steps.

S322-21: Obtain a quantity of active storage nodes that have replicated write data requests to secondary OSDs on other storage nodes in a time period, and record the quantity of the active storage nodes as X'. The active storage node herein is a storage node in which a primary OSD is located. It can be understood that the primary OSD corresponds to a partition, and a primary OSD of a partition may be a secondary OSD of another partition. Therefore, a same storage node can serve as an active storage node, or a standby storage node.

S322-22: In n secondary OSDs related to the foregoing replication operations, count a quantity of other storage nodes that report that each secondary OSD is in the sub-health state, and record the quantity of the other storage nodes that report each OSD as Y'i, where i is an integer from 1 to n.

Alternatively, in n secondary OSDs related to the foregoing replication operations, obtain, through statistics collection, a secondary OSD that is reported to be sub-healthy by a largest quantity of other storage nodes, and record a quantity of the other storage nodes that report the secondary OSD as Y.

S322-23: For each secondary OSD, calculate whether a proportion (Y'i/X') of the storage nodes that report the sub-health state of the secondary OSD is in a preset range, and if the proportion (Y'i/X') is in the preset range, determine that the storage node is sub-healthy, and perform permanent isolation or online temporary isolation on the storage node based on a fault level of the storage node. The fault level can be determined based on factors such as a value of the delay in processing the read/write data request and a proportion of storage nodes affected by the delay. No limitation is imposed in the present invention.

For health status information, reported by a storage node, of an OSD on the storage node, the management node performs the following step:

Perform permanent isolation or online temporary isolation on the storage node based on a fault level.

Alternatively, the health status information received by the management node is the delay in processing the read/write data request. In this case, after receiving such health status information, the management node determines, based on a particular policy, which OSD in the data storage system is in the sub-health state and needs to be temporarily isolated or permanently isolated. For a specific policy, no limitation is imposed in the present invention.

In the foregoing embodiment, a delay that may be encountered in a path for processing the read/write data request is detected, so that a health status of each node in the data storage system is detected more comprehensively and accurately, and the sub-health OSD is correspondingly processed based on a detection result.

In the foregoing data storage system, each OSD may be a primary OSD of a plurality of partitions, or a secondary OSD of some other partitions. Using the OSD 2 as an example, it is assumed that in actual deployment, the OSD 2 is a secondary OSD of X partitions, and is also a primary OSD of Y partitions. Then, X+Y partitions are partitions managed by the OSD 2. When it is determined by using the method in the foregoing embodiment that the OSD 2 is in the sub-health state, another OSD needs to take over the partitions managed by the OSD 2. In this way, when data is to be written into a partition managed by the OSD 2, a write data request that carries the data may be allocated to an OSD that takes over the OSD 2. For ease of description, in the following, an OSD in a sub-health state is referred to as a sub-health OSD; and an OSD used to take over a partition managed by the sub-health OSD is referred to as a takeover OSD. The partition managed by the OSD 2 may be allocated to a plurality of takeover OSDs, or allocated to one takeover OSD. Specific allocation may be determined based on factors such as load of OSDs in the storage system, or determined based on some preset policies.

Figure 4:
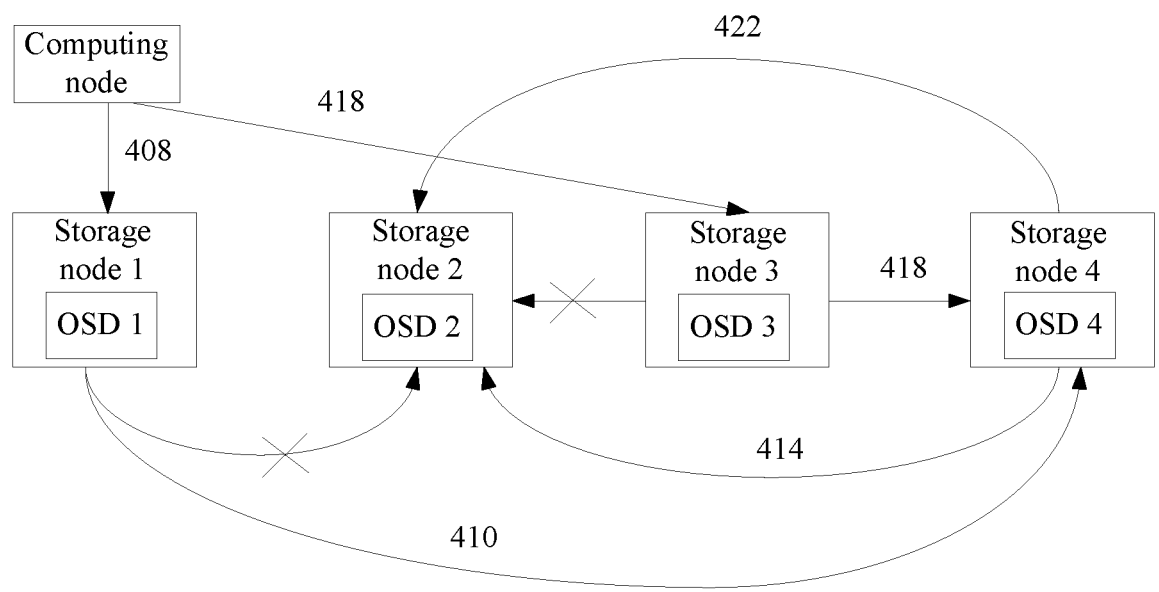
FIG. 4 is a schematic flowchart of switching a sub-health OSD according to an embodiment of the present invention.

The following describes, with reference to FIG. 4, a method for isolating a sub-health OSD in an embodiment of the present invention by using an example in which a secondary OSD (to be specific, an OSD 2) of a partition 1 is determined to be in a sub-health state and a partition on the OSD 2 is allocated to a takeover OSD.

S402: A management node allocates a takeover OSD to the OSD 2, and the takeover OSD takes over the partition managed by the sub-health OSD to take the place of the sub-health OSD to process a subsequent write data request. The management node may use the following algorithm to select a takeover node for the sub-health storage node.

First, another OSD that is not in a same collision domain as the original OSD is preferentially selected. A collision domain is usually preset in a data storage system.

Second, on the premise of meeting a collision domain, an OSD in a storage node in which capacity is lower and a persistent storage resource has no fault is preferentially selected as a takeover OSD, to ensure that storage of a cluster is balanced and dispersed.

For example, when a cabinet is a collision domain, a cabinet that occupies lowest capacity is selected from cabinets that have no collisions. In the cabinet, a server that occupies lowest capacity is selected, and in the server, a storage node that occupies lowest capacity and has no fault in a persistent storage resource is selected.

In this embodiment, for example, the collision domain is set as the cabinet. Based on the foregoing method, an OSD 4 is determined as the takeover OSD of the OSD 2. It can be understood that there may be a plurality of takeover OSDs to take over the partition managed by the OSD 2. No limitation is imposed in the present invention.

Because the management node selects the takeover node OSD 4 to take over the partition managed by the sub-health node OSD 2, the OSD 4 becomes a secondary OSD of the X partitions originally managed by the OSD 2. The OSD 2 is also a primary OSD of the Y partitions. Therefore, before the OSD 4 takes over the Y partitions, the original OSD 2 is degraded to a secondary OSD of the Y partitions, and an original secondary OSD of the Y partitions is upgraded to a primary OSD. Then, the OSD 4 takes the place of the OSD 2 to serve as the secondary OSD of the Y partitions. It can be understood that an MDC updates a partition allocation view of the data storage system based on these changes, and sends an updated partition allocation view to an OSD in a storage node. Because of addition of the takeover node, the updated partition allocation view may further include a correspondence between the sub-health node and the takeover node. Referring to FIG. 4, a switching process includes the following steps (some steps are not shown in the figure).

S404: The management node sends an updated partition allocation view to all computing nodes in a storage system, the takeover node, and an OSD related to the partition taken over by the takeover OSD.

After the takeover, the OSD 4 becomes a secondary OSD of the X+Y partitions, and a current primary OSD of the X+Y partitions may be referred to as the OSD related to the partition taken over by the takeover OSD. The partition allocation view is updated. Therefore, the management node sends the updated partition allocation view to a related node in the storage system.

S406: After receiving the updated partition allocation view, the computing node in the storage system refreshes a local I/O view; and after receiving the partition allocation view, the OSD related to the partition taken over by the takeover OSD updates a local partition allocation view.

S408: After receiving a write data request, a VBS in a computing node 1 determines, based on a write location of to-be-written data, a data length of the to-be-written data, and block device information of the to-be-written data that are included in the write data request, a primary OSD that processes the to-be-written data.

Similar to the foregoing S304, the VBS divides, based on a preset length, the to-be-written data carried in the write data request into a plurality of data blocks, computes, based on a consistent hashing algorithm, partition information corresponding to each data block, and finds a corresponding primary OSD based on a stored I/O view. In this embodiment, it is assumed that the to-be-written data is divided into two data blocks: a data block 1 and a data block 2. It is obtained, through calculation based on the consistent hashing algorithm, that a partition corresponding to the data block 1 is the partition 1 and a partition corresponding to the data block 2 is a partition 2. Referring to the example in the foregoing embodiment, it can be learned, based on the I/O view, that a primary OSD corresponding to the partition 1 is an OSD 1 and a primary OSD corresponding to the partition 2 is the OSD 2. If before the takeover, a secondary OSD corresponding to the partition 1 is the OSD 2 and a secondary OSD of the partition 2 is an OSD 3, after the takeover, the primary OSD corresponding to the partition 1 is still the OSD 1, the secondary OSD corresponding to the partition 1 is the OSD 4, the primary OSD of the partition 2 is the OSD 3, and the secondary OSD of the partition 2 is the OSD 4.

The VBS sends a write data request to the OSD 1 based on an updated I/O view, where the write data request sent to the OSD 1 includes identifiers of the data block 1 and the partition 1. In addition, the VBS also sends a write data request to the OSD 3 based on the updated I/O view, where the write data request sent to the OSD 3 includes identifiers of the data block 2 and the partition 2.

S410: When receiving the write data request that includes the data block 1, the OSD 1 replicates the received write data request to the OSD 4 based on the updated partition allocation view. In this case, the OSD 4 takes the place of the OSD 2 to become the secondary OSD of the partition 1.

S412: After receiving the write data request that includes the identifiers of the data block 1 and the partition 1, the OSD 4 learns, based on the stored partition allocation view, that the OSD 4 is the secondary OSD of the partition 1 and is a takeover OSD of the OSD 2. The OSD 4 writes the data block 1 into a persistent storage resource managed by the OSD 4, and obtains duration consumed for writing the data block 1 into the persistent storage resource.

S414: The OSD 4 further sends the write data request that includes the data block 1 to a background handoff (handoff) thread, where the handoff thread asynchronously sends the write data request to the OSD 2; and records a time at which the write data request is sent.

S416: After receiving a write response returned by the OSD 2, the OSD 4 determines, based on the time, recorded in S414, at which the write data request is sent and a time at which the write response is received, duration required for synchronizing the data to the sub-health OSD (OSD 2).

The OSD 4 may determine, based on a specified policy, whether to report health status information of the OSD 2 to the management node. For example, when the duration required for synchronizing the data to the OSD 2 exceeds a threshold, the health status information of the OSD 2 is sent to the management node. For a method for reporting the health status information of the OSD 2, refer to description in the foregoing embodiment. Details are not described herein again.

S416: The management node determines a health status of the sub-health OSD based on received health status information. For a method for determining a health status of an OSD by the management node, refer to the foregoing embodiment. Details are not described herein again.

In the foregoing S408, the VBS sends, to the OSD 3, the write data request that includes the identifiers of the data block 2 and the partition 2. The following describes a processing process after the OSD 3 receives the write data request that includes the identifiers of the data block 2 and the partition 2.

S418: After receiving the write data request that includes the identifiers of the data block 2 and the partition 2, the OSD 3 learns, based on the updated partition allocation view, that the OSD 3 is a primary OSD of the partition 2. The OSD 3 writes the data block 2 into a persistent storage resource managed by the OSD 3, and obtains duration consumed for writing the data block 2 into the persistent storage resource. In addition, the OSD 3 learns, based on the updated partition allocation view, that the secondary OSD of the partition 2 is a sub-health node and a takeover node of the sub-health node is the OSD 4, and replicates the write data request to the takeover node OSD 4.

S420: After receiving the write data request that includes the identifiers of the data block 2 and the partition 2, the OSD 4 writes the data block 2 into the persistent storage resource managed by the OSD 4, and obtains the duration for writing the data block 2 into the persistent storage resource.

S422: The OSD 4 learns, based on a locally stored updated partition allocation view, that the OSD 4 is the takeover node of the sub-health OSD (OSD 2) and the OSD 2 is the secondary OSD of the partition 2. The OSD 4 sends the write data request that includes the data block 2 to a background handoff (handoff) thread, where the handoff thread asynchronously sends the write data request to the OSD 2; and records a time at which the write data request is sent.

S424: After receiving a write response returned by the OSD 2, the OSD 4 determines, based on the time, recorded in S422, at which the write data request is sent and a time at which the write response is received, duration required for synchronizing the data to the OSD (OSD 2) before the takeover.

The OSD 4 may determine, based on a specified policy, whether to report the health status information of the OSD 2 to the management node. For example, when the duration required for synchronizing the data to the OSD 2 exceeds a threshold, the health status information of the OSD 2 is sent to the management node. For a method for reporting the health status information of the OSD 2, refer to description in the foregoing embodiment. Details are not described herein again.

It can be understood that, over time, data collected on the management node is refreshed. If at a moment, the management node determines that the OSD 2 is already restored to normal, the partition allocation view is updated accordingly. To be specific, in the partition allocation view, a correspondence between the OSD 2 and the takeover node is deleted. After an updated partition allocation view is sent to all the computing nodes in the storage system and the OSD related to the partition taken over by the takeover OSD receives the broadcast, the I/O view stored on the computing node or the partition allocation view stored on the OSD are updated. In this case, it can be determined, based on stored optimal partition allocation, whether identities of active and secondary OSDs need to be refreshed. As described above, the OSD 2 is a primary OSD of some partitions. Therefore, before the OSD 2 is taken over, the OSD 2 is degraded to a secondary OSD of these partitions, and the original secondary OSD is upgraded to the primary OSD of these partitions. After the OSD 2 is restored to healthy, the active and secondary OSDs of these partitions can also be switched back. A manner of switching back the active and secondary OSDs may be: after the management node determines that the OSD 2 is restored to healthy, updating the partition allocation view, and in the updated partition allocation view, for these partitions, switching back the identities of the active and secondary OSDs.

After the OSD 2 in the sub-health state is isolated online, the takeover node asynchronously pushes the received write data request to the OSD 2 by using the handoff thread. Therefore, for the partition 1, the OSD 2 and the OSD 1 maintain data consistency. For the partition 2, the OSD 2 and the OSD 3 maintain data consistency. Once a fault of the OSD 2 is rectified, the OSD 2 can be directly put into use.

Otherwise, if the OSD 2 is always in the sub-health state in a continuous period of time, the management node can remove the OSD 2 from the data storage system.

Figure 5:
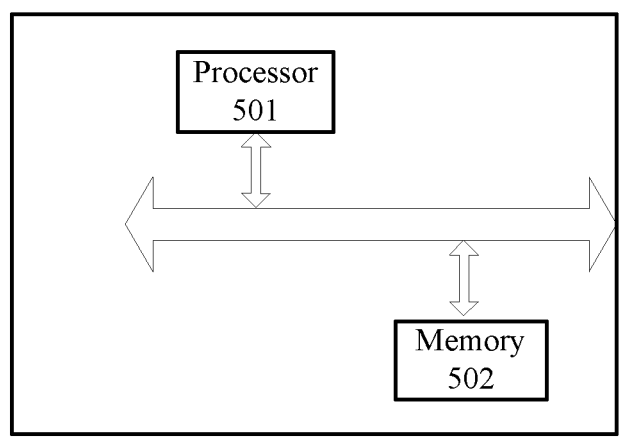
FIG. 5 is a schematic structural diagram of an apparatus according to an embodiment of the present invention.

The VBS, the OSD, and the management node (MDC) that are mentioned in the foregoing embodiments may be implemented by using a software module that is installed on a hardware device of a server. Referring to FIG. 5, the VBS, the OSD, and the management node each may include a processor 501 and a memory 502, where the processor 501 and the memory 502 implement mutual communication through a bus.

The memory 502 is configured to store a computer operation instruction, and may be specifically a high-speed RAM memory or a nonvolatile memory (nonvolatile memory).

The processor 501 is configured to execute the computer operation instruction stored in the memory. The processor 501 may be specifically a central processing unit (central processing unit, CPU), an application-specific integrated circuit (Application Specific Integrated Circuit, ASIC), or one or more integrated circuits configured to implement this embodiment of the present invention.

The processor 501 executes different computer operation instructions stored in the memory 502 to perform actions of the VBS, the OSD, and the MDC in the foregoing embodiments, so as to implement functions of the VBS, the OSD, and the MDC.

Another embodiment of the present invention provides a storage medium, configured to store the computer operation instruction mentioned in the foregoing embodiment. When the operation instruction stored in the storage medium is executed by a computer, the methods in the foregoing embodiments can be performed, so as to implement a function of the foregoing MDC, VBS, or OSD in a data storage system.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions in the embodiments of the present invention.

What is claimed is:

1. A data storage system comprising:
    a management node;
    a plurality of storage nodes, comprising a plurality of Object Storage Devices (OSDs), and the plurality of OSDs comprising a first OSD and a second OSD,
    wherein
    the first OSD is configured to:
        receive a first write data request, wherein the first write data request comprises a to-be-written data block and a corresponding partition to be written with data;
        determine, based on a partition allocation view, that a secondary OSD of the partition to be written with data is the second OSD;
        replicate the first write data request to the second OSD; and
        send a first report message to the management node after duration consumed for replicating the data block to the second OSD is obtained, wherein the first report message comprises an identifier of the first OSD, an identifier of the second OSD, and health status information of the second OSD; and
    the management node is configured to:
        receive the first report message; update, based on the first report message, an OSD health status record stored on the management node; and
        determine, based on the OSD health status record, that the second OSD is in a sub-health state, wherein the OSD health status record comprises health status information, reported by an OSD different from the first and second OSDs, of the second OSD.

2. The data storage system according to claim 1, wherein the system further comprises a computing node, wherein the computing node is configured to:
    receive a second write data request; divide to-be-written data comprised in the second write data request into at least one to-be-written data block;
    determine a partition into which each data block in the at least one data block is to be written;
    determine, based on an I/O view, that the first OSD is a primary OSD that processes the to-be-written data block;
    send the first write data request to the first OSD; and
    send a second report message to the management node after duration consumed for sending the first write data request to the first OSD is obtained, wherein the second report message comprises an identifier of the computing node, the identifier of the first OSD, and health status information of the first OSD; and the management node is further configured to:
  update, based on the second report message, the OSD health status record recorded on the management node; and
  determine, based on the OSD health status record, that the first OSD is in a sub-health state, wherein the OSD health status record comprises health status information, reported by an OSD different from the first and second OSDs, of the first OSD.

3. The data storage system according to claim 2, wherein the computing node is further configured to
  receive a first write data response returned by the first OSD; and obtain, by comparing a time at which the first write data request is sent and a time at which the first write data response is received, the duration consumed for sending the first write data request to the first OSD.

4. The data storage system according to claim 1, wherein the system further comprises a computing node, wherein the computing node is configured to:
  receive a first read data request;
  determine a partition in which each to-be-read data block that is to be read by the first read data request is located; determine, based on an I/O view, that the first OSD is a primary OSD that processes the to-be-read data block;
  send a second read data request to the first OSD; and
  send a second report message to the management node after duration consumed for sending the second read data request to the first OSD is obtained, wherein the second report message comprises an identifier of the computing node, the identifier of the first OSD, and health status information of the first OSD, and the second read data request comprises the partition in which the to-be-read data block is located; and
the management node is further configured to:
  receive the second report message; update, based on the second report message, the OSD health status record stored on the management node; and
  determine, based on the OSD health status record, that the first OSD is in a sub-health state, wherein the OSD health status record comprises health status information, reported by an OSD different from the first and second OSDs, of the first OSD.

5. The data storage system according to claim 4, wherein the computing node is further configured to
  receive a read data response that is returned by the first OSD for the second read data request; and obtain, by comparing a time at which the second read data request is sent and a time at which the read data response is received, the duration consumed for sending the second read data request to the first OSD.

6. The data storage system according to claim 1, wherein the first OSD is further configured to:
  write, into a persistent storage resource corresponding to the corresponding partition to be written with data, the data block that is to be written into a partition managed by the first OSD; and
  send a third report message to the management node after duration consumed for writing the data block into the persistent storage resource is obtained, wherein the third report message comprises the identifier of the first OSD and health status information of the first OSD; and
the management node is configured to
  determine, based on the third report message, that the first OSD is in a sub-health state.

7. The data storage system according to claim 2, wherein the management node is configured to:
  determine, in the plurality of OSDs, a takeover OSD of the second OSD determined to be in a sub-health state;
  establish a correspondence between the second OSD and the takeover OSD;
  update the partition allocation view based on the correspondence between the second OSD and the takeover OSD, wherein an updated partition allocation view comprises an updated I/O view; and
  send the updated I/O view to the plurality of computing nodes and send the updated partition allocation view to the takeover OSD and an OSD that has an active-standby relationship with the second OSD, wherein the takeover OSD is different from the first OSD and the second OSD;
the computing node is configured to:
  receive a third write data request;
  divide to-be-written data comprised in the third write data request into at least one to-be-written data block;
  determine a partition into which each to-be-written data block in the at least one data block is to be written;
  determine, based on the I/O view, that a third OSD is a primary OSD that processes the at least one to-be-written data block; and
  send a fourth write data request to the third OSD, wherein the fourth write data request comprises a data block that is to be written into a partition managed by the third OSD, and the corresponding partition to be written with data, and the third OSD is one of the plurality of OSDs, and is different from the takeover OSD;
the third OSD is configured to
  replicate the fourth write data request to the takeover OSD based on the updated partition allocation view after receiving the fourth write data request, wherein in the updated partition allocation view, a secondary OSD corresponding to the partition to be written with data comprised in the fourth write data request is the second OSD; and
the takeover OSD is further configured to
  synchronize the received fourth write data request to the second OSD based on the updated partition allocation view.

8. The data storage system according to claim 7, wherein the takeover OSD is further configured to
  send the third report message to the management node after duration consumed for synchronizing the third write data request to the second OSD is obtained, wherein the third report message comprises an identifier of the takeover OSD, an identifier of the second OSD, and third health status information of the second OSD; and
the management node is further configured to
  update, based on the third report message, the OSD health status record recorded on the management node; and determine, based on an updated OSD health status record, that the second OSD is restored to normal, wherein the OSD health status record comprises health status information, reported by an OSD different from the first and second OSDs, of the second OSD.

9. The data storage system according to claim 1, wherein the first OSD is configured to
receive a replication response returned by the second OSD; and
obtain, by comparing a time at which the first write data request is sent and a time at which the replication response is received, the duration consumed for replicating the data block to the second OSD.

10. A method for identifying a sub-health Object Storage Device (OSD), in a data storage system comprising a management node and a plurality of storage nodes, each storage node comprising a plurality of OSDs, and the plurality of OSDs comprise a first OSD and a second OSD, and wherein the method comprises:
receiving, by the first OSD, a first write data request, wherein the first write data request comprises a data block that is to be written into a partition managed by the first OSD, and the corresponding partition to be written with data;
determining, by the first OSD, based on a partition allocation view, that a secondary OSD of the partition to be written with data is the second OSD;
replicating, by the first OSD, the first write data request to the second OSD;
sending, by the first OSD, a first report message to the management node after duration consumed for replicating the data block to the second OSD is obtained, wherein the first report message comprises an identifier of the first OSD, an identifier of the second OSD, and health status information of the second OSD;
receiving, by the management node, the first report message; updating, based on the first report message, an OSD health status record stored on the management node; and
determining, by the management node, based on the OSD health status record, that the second OSD is in a sub-health state, wherein the OSD health status record comprises health status information, reported by an OSD different from the first OSD and the second OSD, of the second OSD.

11. The method according to claim 10, wherein the system further comprises a plurality of computing nodes, and before the receiving, by the first OSD, a first write data request, the method comprises:
receiving, by the computing node, a second write data request;
dividing, by the computing node, to-be-written data comprised in the second write data request into at least one to-be-written data block;
determining, by the computing node, a partition into which each data block in the at least one data block is to be written;
determining, by the computing node, based on an I/O view, that the first OSD is a primary OSD that processes the to-be-written data block;
sending, by the computing node, the first write data request to the first OSD; and
the method further comprises:
sending, by the computing node, a second report message to the management node after duration consumed for sending the first write data request to the first OSD is obtained, wherein the second report message comprises an identifier of the computing node, the identifier of the first OSD, and health status information of the first OSD; and updating, by the management node, based on the second report message, the OSD health status record recorded on the management node; and
determining, by the management node, based on the OSD health status record, that the first OSD is in a sub-health state, wherein the OSD health status record comprises health status information, reported by an OSD different from the first and second OSDs, of the first OSD.

12. The method according to claim 11, wherein after the sending the first write data request to the first OSD, the method further comprises:
receiving, by the computing node, a first write data response returned by the first OSD; and
obtaining, by the computing node, by comparing a time at which the first write data request is sent and a time at which the first write data response is received, the duration consumed for sending the first write data request to the first OSD.

13. The method according to claim 10, wherein the system further comprises a plurality of computing nodes, and the method further comprises:
receiving, by the computing node, a first read data request; determining a partition in which each to-be-read data block that is to be read by the first read data request is located;
determining, by the computing node, based on an I/O view, that the first OSD is a primary OSD that processes the to-be-read data block;
sending, by the computing node, a second read data request to the first OSD;
sending, by the computing node, a second report message to the management node after duration consumed for sending the second read data request to the first OSD is obtained, wherein the second report message comprises an identifier of the computing node, the identifier of the first OSD, and health status information of the first OSD, and the second read data request comprises the partition in which the to-be-read data block is located;
receiving, by the management node, the second report message; and
updating, by the management node, based on the second report message, the OSD health status record stored on the management node; and determining, based on the OSD health status record, that the first OSD is in a sub-health state, wherein the OSD health status record comprises health status information, reported by an OSD different from the first and second OSDs, of the first OSD.

14. The method according to claim 13, wherein after the sending a second read data request to the first OSD, the method comprises:
receiving, by the computing node, a read data response that is returned by the first OSD for the second read data request; and
obtaining, by the computing node, by comparing a time at which the second read data request is sent and a time at which the read data response is received, the duration consumed for sending the second read data request to the first OSD.

15. The method according to claim 10, wherein after the receiving, by the first OSD, the first write data request, the method further comprises:
writing, by the first OSD, into a persistent storage resource corresponding to the partition managed by the first OSD, the data block that is to be written into the partition managed by the first OSD;

sending, by the first OSD, a third report message to the management node after duration consumed for writing the data block into the persistent storage resource is obtained, wherein the third report message comprises the identifier of the first OSD and health status information of the first OSD; and determining, by the management node, based on the third report message, that the first OSD is in a sub-health state.

16. The method according to claim 10, wherein after the determining, by the management node, a sub-health OSD, the method further comprises:

determining, by the management node, in the plurality of OSDs, a takeover OSD of the second OSD;

establishing, by the management node, a correspondence between the second OSD and the takeover OSD;

updating, by the management node, the partition allocation view based on the correspondence between the second OSD and the takeover OSD, wherein an updated partition allocation view comprises an updated I/O view;

sending, by the management node, the updated I/O view to the plurality of computing nodes; sending, by the management node, the updated partition allocation view to the takeover OSD and an OSD that has an active-standby relationship with the second OSD, wherein the takeover OSD is different from the first OSD and the second OSD;

receiving, by the computing node, a third write data request;

dividing, by the computing node, to-be-written data comprised in the third write data request into at least one to-be-written data block;

determining, by the computing node, a partition into which each to-be-written data block in the at least one data block is to be written; determining, based on the I/O view, that an third OSD is a primary OSD that processes the at least one to-be-written data block;

sending, by the computing node, a fourth write data request to the third OSD, wherein the fourth write data request comprises a data block that is to be written into a partition managed by the third OSD, and the corresponding partition to be written with data, and the third OSD is one of the plurality of OSDs, and is different from the takeover OSD;

replicating, by the third OSD, the third write data request to the takeover OSD based on the updated partition allocation view after receiving the third write data request, wherein in the updated partition allocation view, a secondary OSD corresponding to the partition to be written with data comprised in the third write data request is the second OSD; and synchronizing, by the takeover OSD, the received third write data request to the second OSD based on the updated partition allocation view.

17. The method according to claim 16, after the receiving, by the third OSD, the third write data request, further comprising:

sending, by the takeover OSD, the third report message to the management node after duration consumed for synchronizing the third write data request to the second OSD is obtained, wherein the third report message comprises an identifier of the takeover OSD, an identifier of the second OSD, and third health status information of the second OSD; and updating, by the management node, based on the third report message, the OSD health status record recorded on the management node; and determining, based on the OSD health status record, that the second OSD is restored to normal, wherein the OSD health status record comprises health status information, reported by an OSD different from the first and second OSDs, of the second OSD.

18. The method according to claim 10, wherein after the replicating the first write data request to the second OSD, the method further comprises:

receiving, by the first OSD, a replication response returned by the second OSD; and obtaining, by the first OSD, by comparing a time at which the first write data request is sent and a time at which the replication response is received, the duration consumed for replicating the data to the second OSD.

19. An object storage device (OSD) comprising:

a processor;

a memory;

a communication bus, wherein the processor and the memory complete mutual communication using the communication bus, wherein the memory is configured to store a program, wherein the processor executes the program to receive a write data request, wherein the write data request comprises a to-be-written data block and a partition into which the to-be-written data block is to be written;

replicate the write data request to a secondary OSD corresponding to the partition to be written with data comprised in the write data request;

obtain duration consumed for replicating the to-be-written data block to the secondary OSD;

write the to-be-written data block comprised in the write data request into a persistent storage resource corresponding to the corresponding partition to be written with data; and send a first report message to a management node, wherein the first report message comprises an identifier of the OSD, an identifier of the secondary OSD, and health status information of the secondary OSD.

20. The OSD according to claim 19, wherein the processor executes the program to obtain duration consumed for writing the to-be-written data block into the persistent storage resource corresponding to the partition to be written with data; and send a second report message to the management node, wherein the second report message comprises the identifier of the OSD and health status information of the OSD.

21. The OSD according to claim 19, wherein the processor executes the program to send sub-health status information of the secondary OSD to the reporting module when determining that the duration consumed for replicating the to-be-written data block to the secondary OSD exceeds a threshold.

22. The OSD according to claim 19, wherein the processor executes the program to send sub-health status information of the OSD to the reporting module when determining that the duration consumed for writing the to-be-written data block into the persistent storage resource corresponding to the partition to be written with data exceeds the threshold.

23. The OSD according to claim 19, wherein the processor executes the program to receive a replication response returned by the secondary OSD; and obtain, by comparing a time at which the write data request is replicated to the secondary OSD and a time at which the replication response is received, the duration consumed for replicating the to-be-written data block to the secondary OSD.

* * * * *